(12) United States Patent
Rabaioli (10) Patent No.: US 8,204,882 B2
(45) Date of Patent: Jun. 19, 2012

(54) METHOD FOR ACCESSING A STORAGE UNIT DURING THE SEARCH FOR SUBSTRINGS, AND A CORRESPONDING STORAGE UNIT

(75) Inventor: Giovanni Rabaioli, Höhenkirchen-Siegertsbrunn (DE)

(73) Assignee: Siemens It Solutions and Services GmbH, Munich (DE)

( * ) Notice: Subject to any disclaimer, the term of this patent is extended or adjusted under 35 U.S.C. 154(b) by 2059 days.

(21) Appl. No.: 10/381,808

(22) PCT Filed: Sep. 7, 2001

(86) PCT No.: PCT/DE01/03458
§ 371 (c)(1),
(2), (4) Date: Mar. 31, 2003

(87) PCT Pub. No.: WO02/27466
PCT Pub. Date: Apr. 4, 2002

(65) Prior Publication Data
US 2004/0015498 A1      Jan. 22, 2004

(30) Foreign Application Priority Data
Sep. 29, 2000   (DE) .................................. 100 48 478

(51) Int. Cl.
*G06F 7/00*     (2006.01)
*G06F 17/30*    (2006.01)
(52) U.S. Cl. ....................................... 707/736; 707/706
(58) Field of Classification Search .................. 707/3, 6, 707/706.736
See application file for complete search history.

(56) References Cited

U.S. PATENT DOCUMENTS

| | | | |
|---|---|---|---|
| 4,606,002 A | | 8/1986 | Waisman et al. |
| 5,706,365 A | * | 1/1998 | Rangarajan et al. ........... 707/102 |
| 5,781,897 A | * | 7/1998 | Chen et al. ........................ 707/3 |
| 6,016,497 A | * | 1/2000 | Suver ......................... 707/103 R |
| 6,026,398 A | * | 2/2000 | Brown et al. ...................... 707/5 |
| 6,105,023 A | | 8/2000 | Callan |
| 6,122,204 A | | 9/2000 | Poplevine et al. |
| 6,192,374 B1 | * | 2/2001 | Lawrence ................... 707/104.1 |
| 6,556,990 B1 | * | 4/2003 | Lane ................................. 707/6 |
| 6,718,325 B1 | * | 4/2004 | Chandra ........................... 707/6 |
| 6,879,976 B1 | * | 4/2005 | Brookler et al. .................. 707/3 |

* cited by examiner

*Primary Examiner* — Charles Lu
(74) *Attorney, Agent, or Firm* — Staas & Halsey LLP (57) ABSTRACT

A number of data sets are recorded, including substrings. Sub-search strings are generated from a predetermined search string in the same manner as the substrings are generated from the complete strings. This procedure results in the provision of a searching method, which can be conducted with a small storage location requirement and with short computing times.

17 Claims, 6 Drawing Sheets

METHOD FOR ACCESSING A STORAGE UNIT DURING THE SEARCH FOR SUBSTRINGS, AND A CORRESPONDING STORAGE UNIT

CROSS REFERENCE TO RELATED APPLICATIONS

This application is based on and hereby claims priority to German Application No. 100 48 478.6 filed on Sep. 29, 2000, the contents of which are hereby incorporated by reference.

BACKGROUND OF THE INVENTION

The invention relates to a method for accessing a storage unit. Computer-aided search methods are known, in which what are known as lists are used, in which key values are used to record data sets, which contain the relevant value. For example the key may be the name of a person. The key value is for example the surname "Bauer". The list for the value "Bauer" then contains data sets for people with the surname "Bauer". The data sets usually also contain further data fields, for example the first name and a telephone number in addition to the surname. To facilitate the search for the data in the other data fields, what are known as inverted lists are used, the keys for which are different from what are referred to as the primary key. For example an inverted list for the key "Ralf" contains all the data sets for people with this first name. Inverted lists allow the computing times for a processor used in the search to be reduced considerably. Nevertheless the computing time can still be considerable, for example a number of minutes, in particular when there are several hundred thousand data sets.

It is also often necessary to search for just one substring, i.e. a string, which only contains some of the characters stored in a data field. Computer-aided search methods for searching for substrings generally require even more computing time than search methods for searching for complete strings, because there is usually no inverted list for the search string including a substring.

A string includes a number of characters, each of which is assigned a specific bit sequence based on a code system. The bit sequences of different characters have the same lengths, e.g. with ASCII (American Standard Code II) or different lengths, e.g. when using a Huffmann code.

A substring contains at least one character less than a complete string. A distinction is made between start strings, inside strings and end strings. A start string contains at least two consecutive characters, of which one character is at one end of a complete string, e.g. at the left end. An inside string contains at least two consecutive characters from the inside of a string, i.e. no peripheral characters. An end string contains at least two consecutive characters, of which one character is located at the other end of a complete string, e.g. the right end.

A search string is a string to be searched for, where applicable containing a search operator and/or a wildcard character. Known wildcard characters are "*" and "?". The "*" replaces one or more characters. The "?" replaces one character.

SUMMARY OF THE INVENTION

An object of the invention is to specify a simple method for accessing a storage unit, which in particular requires less computing time during the search for substrings than previous methods, with reasonable storage costs. A corresponding storage unit and a corresponding program are also to be specified.

The invention is based on the consideration that a first approach for a fast search method for substrings may involve creating an inverse list for every possible search string or substring of a complete string. This would result in a large number of index lists, because a large number of character combinations can occur as search strings and therefore also as substrings for each complete string. Also the inverse lists for one or two characters would have a large number of entries. The storage requirement for such an approach would therefore be very large.

Another approach is therefore selected with the method according to the invention. With the method according to the invention at least two substrings are stored in the storage unit in write mode for each of a number of complete strings and these substrings each contain consecutive characters from the relevant complete string. A number of data sets are recorded for each substring in write mode and the data in these contains the characters from the substring. A search string is also predetermined from consecutive characters. At least one sub-search string is identified automatically from the search string from consecutive characters of the search string in the same manner as the substrings. In storage unit read mode at least one substring is identified for the sub-search string(s), which contain the same sequence of characters as the sub-search string. The records or data sets stored for an identified substring are also read in storage unit read mode. The records or data sets which are read are used to restrict the search result.

With the method according to the invention a direct search is not executed for the search string. Sub-search strings are first identified from the search string, for which inverted lists may exist. With the method according to the invention therefore inverted lists are not stored for all search strings, but only for specific sub-search strings. Determination of the sub-search strings in the same or a similar manner to the sub-strings primarily gives the same result. Changes to the sequence, in which the sub-search strings are generated, are insignificant. This means that the storage capacity required to store the inverted lists is considerably less than for storing all possible combinations of search strings or substrings. With the method according to the invention inverted lists are identified for the sub-search strings in the nature of a preselection. Then in a second stage the result must be restricted. The records stored in the identified substrings or the data in the recorded data sets can be used for this purpose. The two-stage search method does require somewhat more computing time than for one-stage access to just one inverted list. However significant reduction of storage capacity for storing the inverted lists can be achieved for around the same computing times for searches.

In a development of the method according to the invention two sub-search strings are identified from the search string. At least one substring is identified in read mode for each sub-search string. The records or data sets stored for the identified substrings are read. To restrict the search, the records are identified, which are recorded for each identified substring. The logical AND operation can be implemented for this. If no substring is identified for a sub-search string, the search process is aborted, because the AND operation would later result in an empty quantity.

In a subsequent development of the method according to the invention at least one sub-search string is selected from the search string in each of at least two different manners. At least one substring is identified in read mode for each of the sub-search strings selected in one manner and used to restrict the search. The search results for the different manners of selecting the sub-search strings are then collated, preferably using the logical OR operation. The cost of the search increases linearly for each manner of selection. However search processes can also be quickly aborted. The different manners mean that it does not have to be decided before the search whether the selected manner actually corresponds to the manner used to identify the substrings of the complete string sought. By simply trying all the manners, it can be ensured that the manner actually used is also taken into account. Appropriate choice of the manner of selection also means that the number of manners of selection is very small, for example there are only two, three, four or five different manners. This represents a significant restriction of options compared with the large number of combinations with full indexing of a complete string.

In another development each character position of a complete string is assigned at least one substring, which contains the character in the relevant position. This ensures that the complete string specified by the search string can be identified for any search string, if it occurs in the data sets stored. Alternatively or as well, only one substring is assigned to at least one character position of a complete string. This reduces the number of substrings significantly.

In another development of the method according to the invention, exactly two substrings are assigned to at least one character position in the complete string, each of which contains the character in the relevant position. Such an overlap means that the possible variations are further restricted. During the search this means that the sequence of substrings can also be taken into account. In particular there is an overlapping of substrings in the development.

In another development at least one group of adjacent positions in the complete string is assigned exactly two substrings, each of which contains the characters in the relevant positions. The overlapping in a number of characters means that the sequence of sub-search strings can be better taken into account.

In another development at least the substrings within complete strings contain the same number of characters from the complete string. Substrings with three characters are preferably used for databases with up to twenty thousand data sets. Substrings with four characters are used for bigger databases, for example databases with several hundred thousand data sets. As the number of characters per substring increases, so too does the number of possible manners of selecting a substring or sub-search string from the search string. Very good results have been achieved with regard to storage capacity and access times with four-character substrings and a two-character overlap for databases with several hundred thousand data sets.

In a subsequent development substrings at the start of complete strings contain a small number of characters from the complete string as substrings within complete strings. For example the start substrings contain one character from the complete string less than the substrings inside the complete string. This takes account of the fact that with substrings at the start of a complete string the sequence in respect of previous substrings does not yet have to be taken into account. In order to implement a standard method and to facilitate the search for start substrings, the complete strings at the start are recorded specially, for example in a specific storage section or by prefixing them with a character, which is not in the complete string.

In a subsequent development sub-search strings are identified from the search strings in the same manner as substrings are identified from the complete string. This ensures that even with indexing only selected substrings from each complete string can be identified, which contain the selected substrings. "In the same or a similar manner" here is result-related. Differences in the sequence, in which the substrings or sub-search strings are generated, are insignificant.

In one development different start positions are selected for a number of options for selecting the sub-search strings within the search string. The sub-search strings are selected in the same manner on the basis of a start position. The development is used in particular when wildcard characters are used in the sub-search string to determine that the string being sought is inside or at the end of a complete string.

In the case of search strings to search for start strings, in another development the sub-search string is selected in only one manner. The point of reference can for example be the start of the string. Starting from this point of reference, there is only one possibility for determining the sub-search strings in the same manner as the substrings.

In another development the characters are letters or figures or both, and each character is coded according to a coding instruction in a bit sequence of predetermined length. A method according to the invention can however also be used with characters, which for example represent picture elements.

In a subsequent development the search string contains a wildcard character for at least one character in at least one position. Sub-search strings without wildcard characters are used in the search in preference to sub-search strings with wildcard characters. A wildcard character in a sub-search string often results in very many inverted lists. Appropriate selection of sub-search strings means that not all sub-search strings have to be taken into account and yet a complete search result can be specified. Therefore sub-search strings, which result in no significant restriction of the search result, i.e. in particular sub-search strings with wildcard characters, are not taken into account.

In a subsequent development of the method according to the invention a comparison of data from preselected data sets is carried out with the complete search string to restrict the search. This measure alone ensures that the last selected data sets also actually contain the search string. Subdivision into sub-search strings alone does not always guarantee this lack of ambiguity.

The invention also relates to a storage unit. The substrings are stored in the storage unit. Also a number of data sets are recorded for each of the substrings, containing data with the relevant substrings. In a development of the storage unit data is stored in the storage unit, which is required to implement the method according to the invention or one of its developments, for example the data sets. The technical effects referred to above therefore also apply to the storage unit and its developments.

The invention also relates to a program, on execution of which by the processor the method stages according to the method according to the invention or one of its developments are carried out. The technical effects mentioned above therefore also apply to the program.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
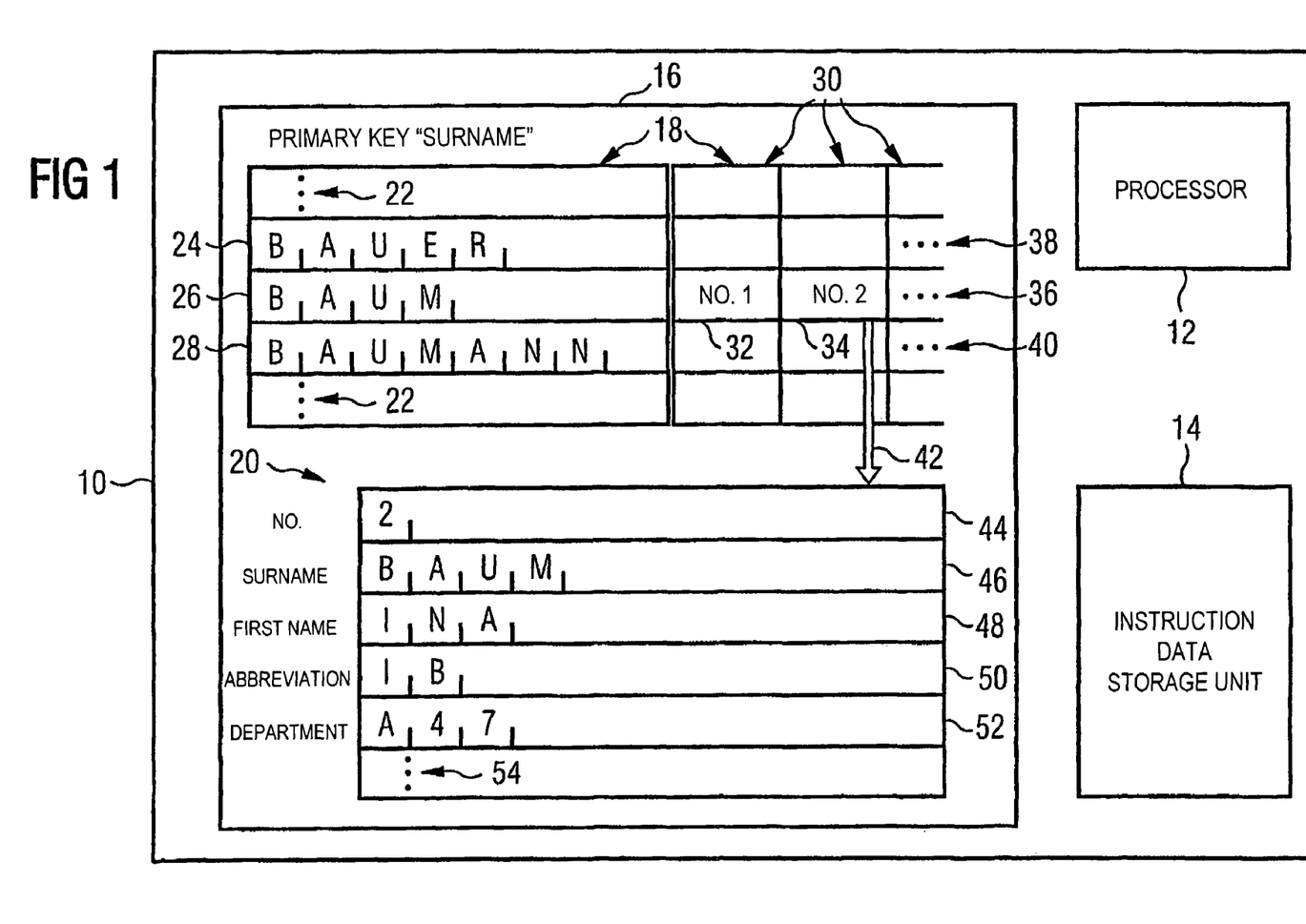
FIG. 1 is a block diagram of a data processing unit, in the storage unit of which search lists and inverted search lists are stored.

FIG. 1 shows a data processing unit 10, which has a processor 12, an instruction data storage unit 14 and a personal data storage unit 16. The processor 12, for example an 80x86 series processor, executes instructions stored in the instruction data storage unit 14, in order to access the personal data storage unit 16. The instruction data storage unit 14 and the personal data storage unit 16 are located in a storage unit, e.g. in a RAM (Random Access Memory), in a ROM (Read Only Memory) or on a hard disk.

There are search lists 18 and personal data sets 20 in the personal data storage unit 16. FIG. 1 shows three search lists for the primary key "Surname", for the surnames "Bauer", "Baum" and "Baumann". Further search lists 22 are shown by dots. The values "Bauer", "Baum" and "Baumann" are stored in this sequence in data fields 24, 26 and 28. There are a number of entries 30, for each data field 24 to 28, in which reference is made to data sets, which contain the value stored in the relevant data field. In this manner entries 32 and 34 belong to data field 26 for the surname "BAUM". Further entries 36 for data field 26 are shown by dots. Dots also indicate further entries 38 and 40 for the data field 24 and for the data field 28. A data set no. 1 (not shown) is recorded in the entry 32. A data set is recorded in the entry 34 with no. 2, shown in the lower section of the personal data storage unit, see arrow 42.

The data fields 24 to 28 are for example stored in a first domain of the personal data storage unit 16. A reference to the corresponding entries 30 is stored immediately after the storage cells for storing the characters of a data field 24, 26 or 28 and these entries are stored in a further storage domain of the personal data storage unit 16. This arrangement facilitates a binary search in the data fields 24 to 28. The personal data sets 20 all have the same structure, so that only the structure of a personal data set with the number 2 is described below. The data set 20 contains five data fields 44 to 52. Further data fields 54 are indicated by dots. In the first data field 44 the number of the data set is recorded, for example no. 2. In the second data field 46 the name of the person, for whom the relevant data set is set up, is recorded, for example the name "BAUM". In the third data field 48 the first name of the person in question is recorded, for example the first name "INA". The fourth data field 50 contains an abbreviation, with which the person in question signs, e.g. the abbreviation "IB" from the initials of the name "INA BAUM". In the fifth data field 52 the department is recorded, in which the person, for whom the data set was set up, works, for example department "A47". To facilitate the search for first names, abbreviations or departments, there are also search lists for these keys and these are described as inverted search lists. These search lists are however not shown in FIG. 1.

Figure 2:
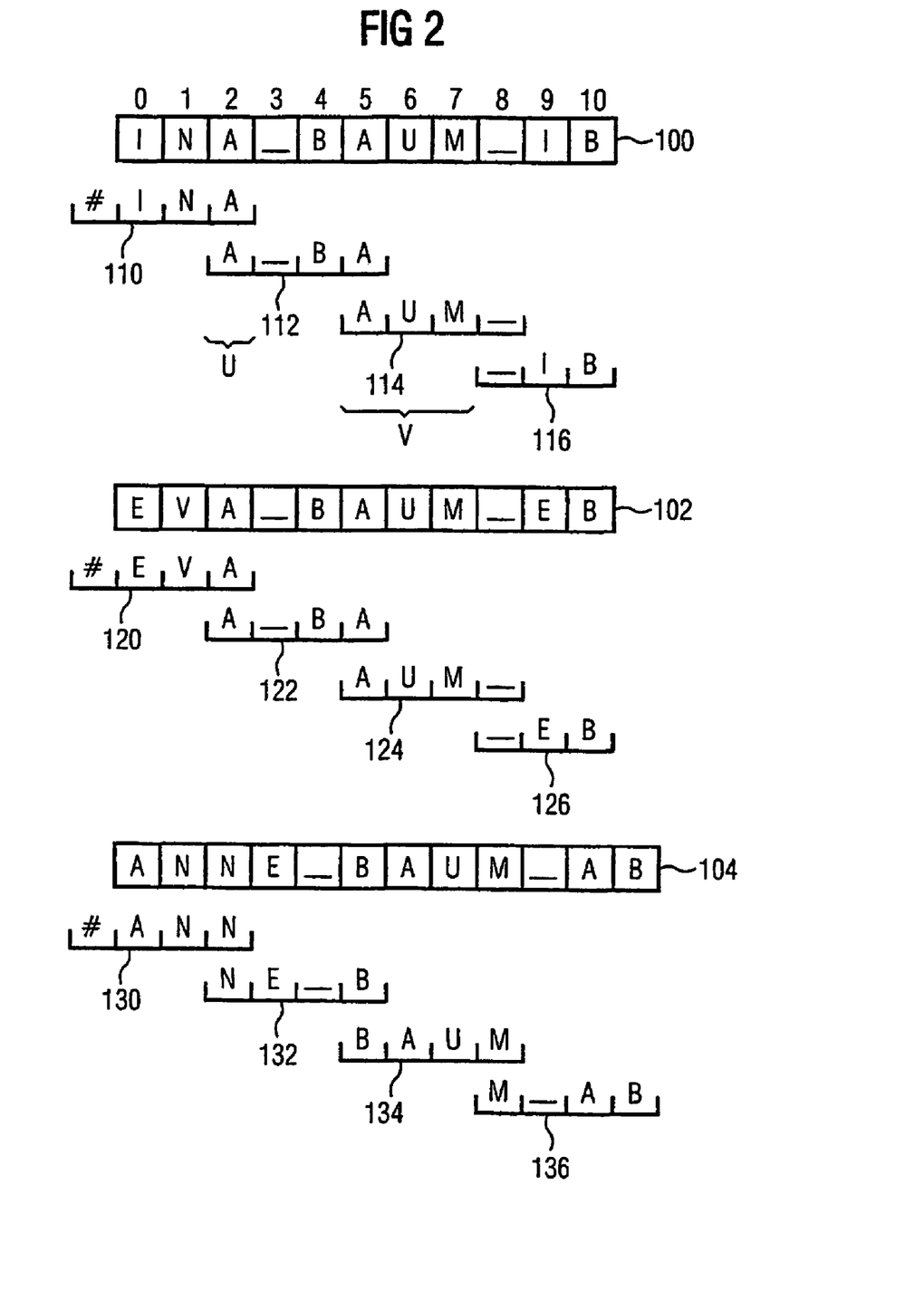
FIG. 2 shows substrings for three complete strings

FIG. 2 shows three complete strings 100, 102 and 104, each of which is stored in a data field of a personal data set and which should allow a search for any components of a name. The complete strings 100, 102 and 104 are stored in this sequence in personal data sets no. 2, no. 8 and no. 9.

The complete string 100 contains eleven characters 0 to 10 of the string "INA_BAUM_IB". The complete string 100 is assigned four substrings 110 to 116. The substrings 110 to 116 are assigned to the complete string 100 according to a method, which is the same for all complete strings 100, 102 and 104. It starts from the left with the first three characters. These characters are assigned to the substring 110. A character "#" inserted in front of these characters in the substring characterizes the substring 110 as a start string. The substring 110 is "#INA". The last letter of the substring 110 is then also taken over into the next substring 112. The next three characters of the complete string are then taken over into the substring 112, i.e. the characters "_BA". The substring 112 is "A_BA". There is then an overlap U of the substring 110 and the substring 112 in the end character "A" and the start character "A". In a subsequent stage the end letter "A" is taken over as the start letter "A" of the substring 114. The three characters of the complete string 100 after the letter "A" are added to the letter "A" of the substring 114. The substring 114 then contains the characters "AUM_". The character "_" is also taken over into the last substring 116. The remaining letters of the complete string 100 are then taken over into the substring 116. The substring 116 contains the characters "_IB" and therefore only three characters.

There is a displacement V of three characters from the start of a substring, e.g. from the start of the substring 114 to the start of the next substring, e.g. to the start of the substring 116. The following relationship exists between the overlap U and the displacement V:

$$U = L - V \qquad (1),$$

where L designates the length of the substrings 110, 112 and 114.

The complete string 102 contains the string "EVA_BAUM_EB". The complete string 102 is again assigned four substrings 120 to 126 according to the predetermined system, which contain the strings "#EVA", "A_BA", "AUM_" and "_EB" in this sequence.

The complete string 104 contains the string "ANNE_BAUM_AB" made up of twelve characters. According to the standard system the complete string 104 is assigned four substrings 130 to 136, which contain the strings "#ANN", "NE_B", "BAUM" and "M_AB" in this sequence.

Figure 3:
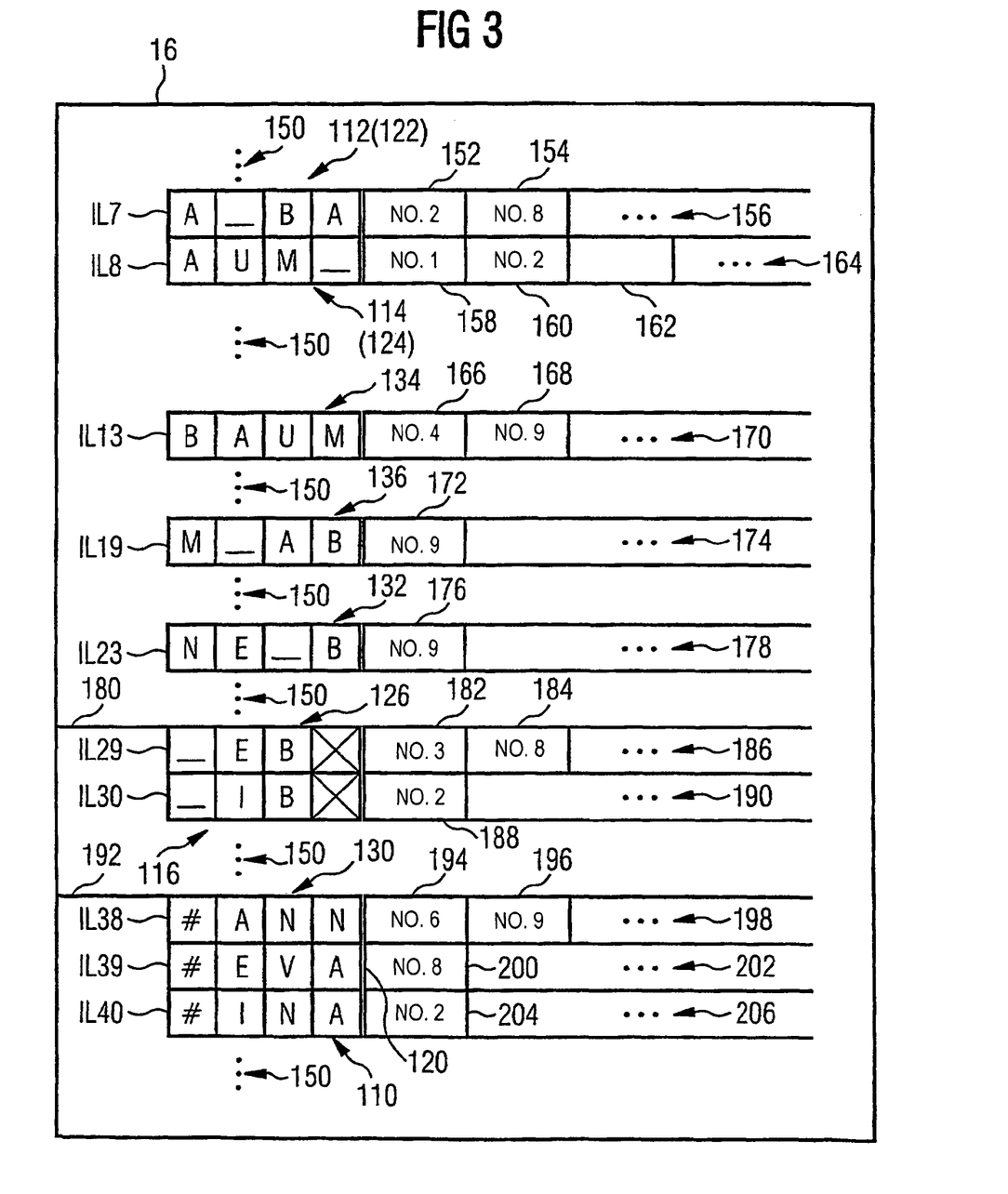
FIG. 3 shows inverted search lists assigned to the substrings

FIG. 3 shows the inverted search lists IL7 to IL40 assigned to the substrings 110 to 116, 120 to 126 and 130 to 136 in alphabetical order. The inverted search lists IL7 to IL40 are stored in the personal data storage unit 16. Dots indicate further inverted search lists 150, which are stored between the search lists shown in FIG. 3 or before or after these search lists. The substring 112 corresponds to the substring 122. Only one inverted search list, namely the inverted search list IL7, is stored for the two substrings 112 to 122. Entries 152 and 154 contain the nos. 2 and 8 of the personal data sets, which contain the string "A_BA". Dots indicate further entries 156 in the inverted search list IL7.

An inverted search list IL8 has also been stored for the string "AUM_" among others. This string corresponds to the substrings 114 and 124. It can be assumed that the string "AUM_" also occurs in a data field of the personal data set no. 1. Entries 158, 160 and 162 contain references in this sequence to the personal data sets no. 1, no. 2 and no. 8. Dots indicate further entries 164 in the inverted search list IL8.

An inverted search list IL13 has been set up for the substring "BAUM", i.e. for the substring 134 among others. Entries 166 and 168 in the inverted search list IL13 refer in this sequence to the personal data sets no. 4 and no. 9, which contain the substring "BAUM". Dots indicate further entries 170 in the inverted search list IL13.

An inverted search list IL19 has been set up for the substring "M_AB", i.e. for the substring 136 among others. An entry 172 in the inverted search list IL19 refers to the personal data set no. 9. Dots indicate further entries 174 in the inverted search list IL19.

An inverted search list IL23 has been set up for the substring "NE_B", i.e. for the substring 132 among others. An entry 176 in the inverted search list IL32 therefore refers to the personal data set no. 9. Dots indicate further entries 178 in the inverted search list IL23. The inverted search lists IL7, IL8, IL13, IL19 and IL23 are located in a storage domain of the personal data storage unit 16, in which substrings are stored, each of which contains four characters of a complete string 100, 102 and 104.

In a separate storage domain of the personal data storage unit 16 there are inverted search lists for substrings from the ends of the complete strings 100, 102 and 104 with fewer than four characters, see limit 180. An inverted search list IL29 has been set up for the substring "_EB", i.e. for the substring 126 among others. The personal data sets no. 3 and no. 8 are recorded in entries 182 and 184 of the inverted search list IL29. Dots indicate further entries 186 in the inverted search list 29.

An inverted search list IL30 has been specified for the substring "_IB", i.e. for the substring 116 among others. The inverted search list IL30 contains an entry 188, which refers to the personal data set no. 2. Dots indicate further entries 190 in the inverted search list IL30.

Inverted search lists IL38, IL39 and IL40 and others for the start substrings 130, 120 and 110 are stored in a subsequent separate domain of the personal data storage unit, see limit 192. The inverted search list IL38 contains entries 194 and 196, which refer to the personal data sets no. 6 and no. 9. Dots indicate further entries 198 in the inverted search list IL38.

The inverted search list IL39 for the substring "#EVA" contains an entry 200, which refers to the personal data set no. 8. Dots indicate further entries 202 in the inverted search list IL39.

The inverted search list IL40 for the substring "#INA" contains an entry 204, which refers to the personal data set no. 2. Dots indicate further entries 206 in the inverted search list IL40.

By using a number of storage domains the search for end strings with fewer than four characters can be simplified as can the search for start strings, because only a relatively small storage domain has to be searched through. The storage domain for storing substrings with four characters is significantly larger than the other two storage domains.

Figure 4:
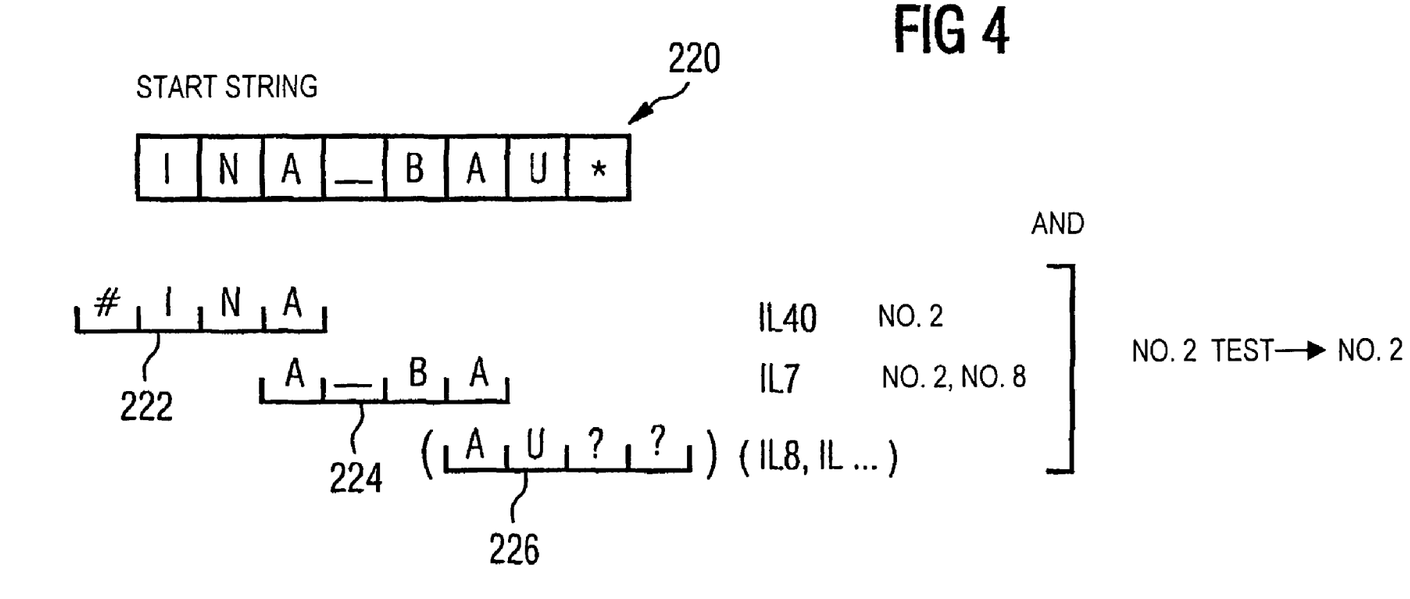
FIG. 4 shows the subdivision of a search string containing a start string, into substrings.

FIG. 4 shows the subdivision of a search string 220 into three sub-search strings 222 to 226. The search string 220 is predetermined by a data processing unit 10 operator, who only remembers the first name of the person to be found and the start of the surname of this person. The search string 220 contains the characters "INA_BAU*". The "*" is a wildcard character for other characters after the letter U. Therefore the search string 220 is a start string.

The search string 220 is subdivided into sub-search strings 222 to 226, in the same manner as the complete strings 100, 102 and 104 into substrings 110 to 136. The first three letters of the search string 220 are assigned to the first sub-search string 222. Inserting the character "#" as a prefix characterizes the sub-search string 222 as a start string. The sub-search string 222 is "#INA". The end letter of the substring 222, i.e. the letter "A" is selected as the first letter of the next substring 224. The three characters after the letter "A" in the search string 220, i.e. the characters "_BA" are then taken over into the sub-search string 224. The sub-search string 224 then contains the characters "A_BA". The last letter "A" of the sub-search string 224 is selected as the first letter of the next sub-search string 226. The remaining letter "U" of the search string 220 is taken over into the sub-search string 226. The remainder of the sub-search string 226 is filled in with wildcard characters "?". The sub-search string 226 is "AU??".

In a subsequent stage of the method for accessing the personal data storage unit 16, this is searched for the sub-search string 222. The inverted search list IL40 is identified in this process. In a next search stage the personal data storage unit 16 is searched for the sub-search string 224. The inverted search list IL7 is identified in this process.

A search for the sub-search string 226 would result in other inverted search lists IL in addition to the inverted search list IL8. Therefore in the embodiment sub-search strings with wildcard characters "?" are not used for the search. This is clarified in FIG. 4 by brackets.

In a subsequent stage of the method the inverted search lists IL40 and IL7 found are compared using the AND operation. It is determined that the personal data set no. 2 is contained in both inverted search lists IL40 and IL7. In a subsequent test stage the data field with the complete string 100 is read from the personal data set no. 2 and compared with the complete search string 220. It is determined that the search string 220 is contained in the complete string 100. This means that the personal data set no. 2 is given as the result of the search.

Figure 5:
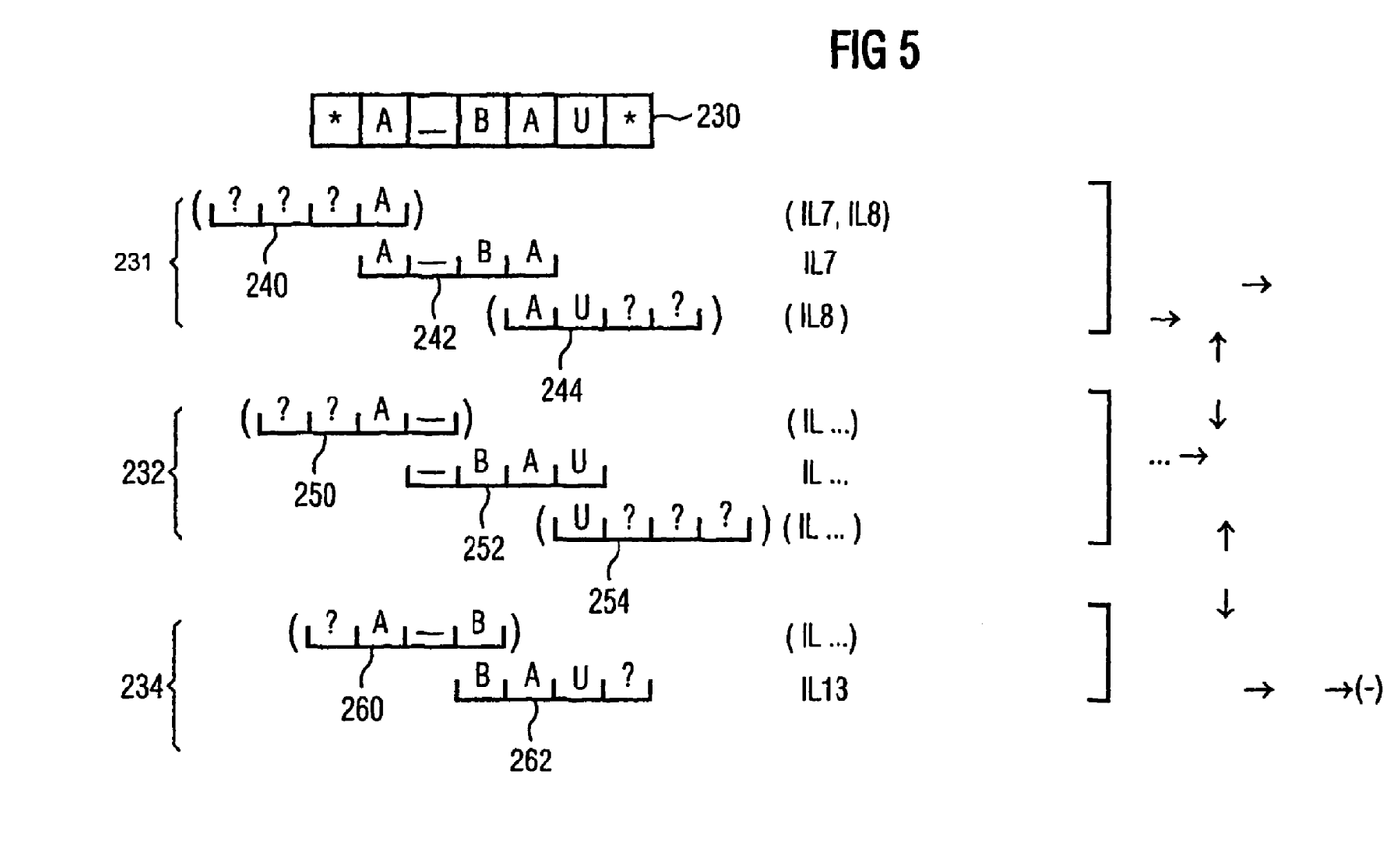
FIG. 5 shows the subdivision of a search string containing an inside string into a number of groups of sub-search strings.

FIG. 5 shows the subdivision of a search string 230 into three groups 231 to 234 of sub-search strings. The search string 230 is again predetermined by a data processing unit 10 operator. The search string 230 contains the string "*A_BAU*". The wildcard character "*" at the start and end of the search string 230 means that it must be an inside string.

Sub-search strings 240, 242 and 244 of the group 231 are considered first. To determine sub-search strings 240 to 244 the procedure is essentially the same as when determining substrings 110 to 136 on the basis of complete strings 100 to 104. As however the starting point for determining the search strings can be located at different positions in the search string 230, the three groups 231, 232 and 234 are created. The group 231 results from selecting the letter "A" to the right of the first wildcard character "*" as the starting point. The substring 240 contains three wildcard characters "?" and the end letter "A". As already stated, sub-search strings with wildcard characters are however not used in the search where possible. The search with the sub-search string 240 would in particular result in too many inverted search lists as the search result, e.g. the inverted search lists IL7 and IL8. Brackets again clarify that the sub-search string 240 is not used in the search.

The next sub-search string 242 contains the last letter "A" of the sub-search string 240 and the three letters "_BA" of the search string 230 following the letter "A". There is no wildcard character "?" in the sub-search string 242. Therefore the search for an inverted list for this sub-search string is executed in the personal data storage unit 16. The inverted search list IL7 is found.

The sub-search string 244 contains the last letter "A" of the previous substring 242 and the remainder of the search string 230, i.e. the string "U*". Instead of the wildcard character "*" in the sub-search string 244, two wildcard characters "?" are added. As the sub-search string 244 contains wildcard characters "?", it is not used for a search. It is not necessary to carry out the AND operation for the group 231, as only the sub-search string 242 is free from wildcard characters. In one test stage the data sets recorded in the inverted search list IL7 are read, including the data sets no. 2 and no. 8. The data fields in these data sets for the complete strings are used to verify whether the complete strings contain the search string 230. It is ascertained in this process that this is the case for both the data set no. 2 and the data set no. 8. The search results are recorded for a later output.

The underscore in the search string 230 is selected as the point of reference for selecting sub-search strings 250 to 254 for the group 232. The standard method is used once again. The sub-search string 250 contains the characters "??A_". The sub-search string 250 is not used for the search because of the wildcard character "?". The sub-search string 252 contains the string "_BAU" and is used for the search. An inverted search list IL is identified in this process.

The sub-search string 254 contains the string "U???" and is therefore not used for the search. It is not necessary to carry out the AND operation for the group 232. The inverted search list IL identified for the sub-search string 252 shows that this search list does not refer to any data sets containing the search string 230.

The group 234 contains two sub-search strings 260 and 262. The letter "B" of the search string 230 is selected as the point of reference for determining the sub-search strings 260 and 262. The sub-search string 260 contains the string "?A_B". The sub-search string 260 is not used for the search because of the wildcard character "?". The sub-search string 262 contains the last letter "B" of the previous sub-search string 260 at the start. The remainder of the search string 230 then follows. The wildcard character "*" is replaced by a wildcard character "?". The sub-search string 262 contains the string "BAU?". As both sub-search strings 260 and 262 contain wildcard characters, a sub-search string must be selected, which is used for the search. In the embodiment this is the sub-search string 262. The inverse search list IL13 is identified when identifying an inverse search list for the sub-search string 262. The data sets no. 4 and no. 9 are among those recorded in the inverse search list IL13. An AND operation does not have to be executed due to the use of only one sub-search string 262 of the group 234. When comparing the complete search string 230 with the complete strings of the data sets no. 4 and no. 9, it is determined that none of these complete search strings contains the search string 230.

Collation of the individual search results for the groups 231, 232 and 234 according to the OR operation shows that the data sets no. 2 and no. 8 form the search result. These data sets are displayed on a screen in the data processing unit 10.

In a different embodiment the sub-search strings 260 and 262 are used for the search. The groups 231 and 232 remain the same.

Figure 6:
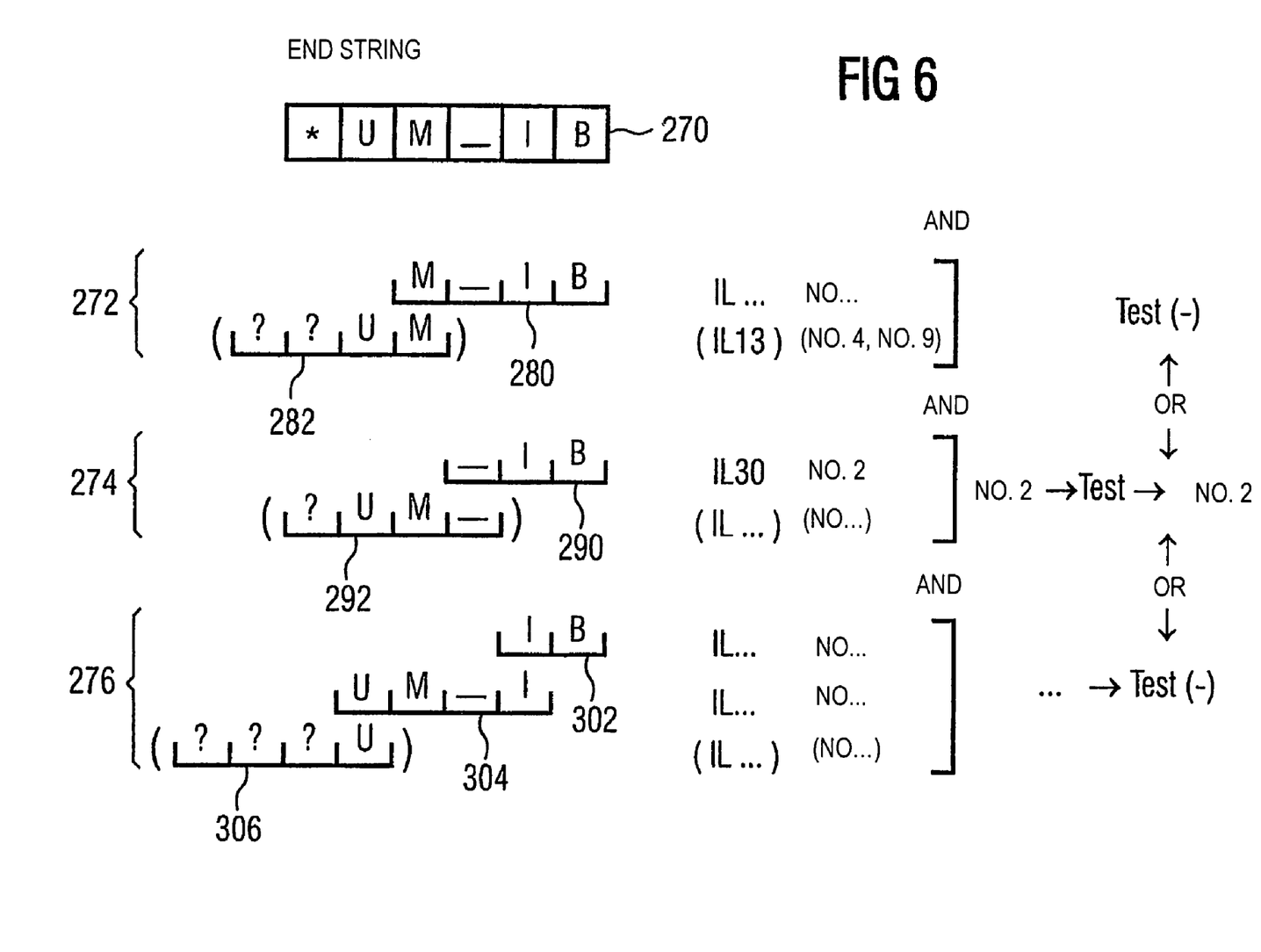
FIG. 6 shows the subdivision of a search string containing an end string into a number of groups of substrings.

FIG. 6 shows the subdivision of a search string 270 into a number of groups 272, 274 and 276 of sub-search strings. The search string 270 is predetermined by an operator and contains the string "*UM_IB". The wildcard character "*" at the start of the search string 270 establishes that it is an end string. As it is not known how many characters come before the U, the standard method for determining substrings must be executed three times, giving the groups 272 to 276. In order first to generate sub-search strings without wildcard characters, the operation to determine the sub-search strings starts from the right. Otherwise the method for determining substrings remains the same.

The letter "M" is selected as the point of reference for the group 272. A sub-search string 280 contains the string "M_IB". An inverted list IL is identified during the search for an inverted list for this sub-search string 280. The next sub-search string 282 contains the first letter "M" of the previous sub-search string 280 in last position due to the reversed sequence when determining the sub-search strings 280 and 282. The letters of the sub-search string 282 before this are taken over from the characters in the search string 270 before the letter "M". The sub-search string 282 contains the string "??UM". However the sub-search string 282 is not used for the search because of the wildcard characters "?". The AND operation does not have to be executed for the group 272. During the test with the complete search string 270 it is determined that none of the data sets recorded in the search list IL contains the search string 270.

For the group 274 the underscore in the reference string 270 is selected as the point of reference. A sub-search string 290 is then determined with three characters, specifically the characters "_IB". The inverted search list IL30 is identified for the sub-search string 290. As already stated, the inverted search list IL30 contains the data set no. 2. When determining the next sub-search string 292 the first character "_" of the sub-search string 290 is taken over as the last character. The other characters are formed by the three characters of the search string 270 before the underscore. The wildcard character "*" is replaced by the wildcard character "?". This means that the sub-search string 292 contains the string "?UM_". The sub-search string 292 is not used for the search because of the wildcard character "?". An AND operation does not have to be executed within the search result for the group 274. When testing the data sets recorded in the inverted search list IL30, it is determined that only the data set no. 2 contains the search string 270. The data set no. 2 is stored for a subsequent output.

When determining sub-search strings 302, 304 and 306, the letter "I" of the search string 270 is selected as the point of reference. The sub-search string 302 contains the string "IB". There is precisely one inverted search list IL for the string "IB". The next sub-search string 304 contains the string "UM_I". Precisely one inverted search list IL is also identified for this sub-search string 304. The sub-search string 306 contains the string "???U" and is not used for the search because of the many wildcard characters "?". The AND operation is then used to identify data sets, which are recorded in both the inverted search list for the string "IB" and in the inverted list for the string "UM_I". The results of the AND operation are then tested to establish whether the recorded data sets contain the search string 270. It can be assumed that this is not the case for any of the recorded data sets. The search results for the groups 272, 274 and 276 are then collated according to the OR operation. Only the data set no. 2 is output as the search result.

In a different embodiment sub-search strings which contain a wildcard character "?" are also used for the search.

It can therefore be determined that the AND link within a group is not essential but is expedient in order to restrict the results. A complete test result can be achieved on the basis of the conclusive comparison with the search string even without an AND link.

The OR link of the results for a number of groups is however essential, in order to obtain a complete search result.

The invention has been described in detail with particular reference to preferred embodiments thereof and examples, but it will be understood that variations and modifications can be effected within the spirit and scope of the invention.

The invention claimed is:

1. A method for accessing a storage unit, comprising:
   identifying at least two substrings for each of a plurality of complete strings, each substring including consecutive characters from one complete string;
   storing said substrings in a first domain of a storage unit;
   recording a plurality of data sets including at least one of the substrings for each of the at least two substrings in a second domain of the storage unit separate from said first domain;
   automatically selecting at least one sub-search string containing a sequence of characters in a predetermined search string;
   searching in read mode for at least one of the substrings containing the sequence of characters in the at least one sub-search string;
   storing at least one of the recorded data sets for at least one identified substring located during said searching in a third domain of the storage unit; and
   restricting a search result based on the at least one of the recorded data sets.

2. A method according to claim 1,
   wherein said selecting selects at least two sub-search strings from the search string,
   wherein said searching finds at least one substring in read mode for each sub-search string,
   wherein the at least one of the records and data sets stored for the identified substrings are read in read mode, and
   wherein said method further comprises identifying the at least one of the records and data sets using a logical AND operation prior to said storing of the at least one of the records and data sets for each identified substring.

3. A method according to claim 2,
   wherein said selecting selects at least one sub-search string from each search string in each of at least two different manners,
   wherein said searching finds at least one substring in read mode for each sub-search string selected in one manner that is used in said restricting of the search result, and
   further comprising collating search results for the different manners of selecting the sub-search strings using a logical OR operation.

4. A method according to claim 3, further comprising at least one of
   assigning each character position in a complete string to at least one substring, each substring containing the characters in relevant positions, and
   assigning at least one character position of a complete string to only one substring.

5. A method according to claim 4, wherein first and second substrings are assigned to at least one character position of the complete string and each contains the character in the relevant position.

6. A method according to claim 5, wherein third and fourth substrings are assigned to at least one group of adjacent positions in the complete string and each contains the characters in the relevant positions.

7. A method according to claim 6, wherein each of the substrings located within complete strings contain three characters.

8. A method according to claim 7, wherein start substrings are recorded in a different manner than interior substrings located within complete strings and not including a starting character.

9. A method according to claim 6, wherein each of the substrings located within complete strings contain four characters.

10. A method according to claim 9, wherein each substring obtained from a start of one of the complete strings contains three characters from the complete string preceded by a character not contained in any of the complete strings.

11. A method according to claim 6, wherein said selecting of at least one sub-search string from the search string is in a identical manner to the formation of substrings from complete strings.

12. A method according to claim 11, wherein said selecting of at least one sub-search string within the predetermined search string includes selecting different start positions from which selections are made from the sub-search strings in the identical manner.

13. A method according to claim 11, wherein said selecting of at least one sub-search string selects start strings in only one manner.

14. A method according to claim 13, wherein the characters are at least one of letters and figures, each of which is coded according to a coding instruction in a bit sequence of predetermined length.

15. A method according to claim 14,
    wherein the predetermined search string contains at least one wildcard character for at least one character in at least one position, and
    wherein no wildcard characters are included in the at least one sub-search string used in said searching.

16. A method according to claim 15, wherein said restricting includes comparing data from preselected data sets with all of the predetermined search string.

17. A computer readable medium storing an instruction sequence to control a processor to perform a method comprising:
    identifying at least two substrings for each of a plurality of complete strings, each substring including consecutive characters from one complete string;
    storing said substrings in a first domain of a storage unit;
    recording a plurality of data sets including at least one of the substrings for each of the at least two substrings in a second domain of the storage unit separate from said first domain;
    automatically identifying at least one sub-search string containing a sequence of characters in a predetermined search string;
    searching in read mode for at least one of the substrings containing the sequence of characters in the at least one sub-search string;
    storing at least one of the recorded data sets for at least one identified substring located during said searching in a third domain of the storage unit; and
    restricting a search result based on the at least one of the recorded data sets.

* * * * *